Nov. 30, 1926.

A. F. MASURY 1,608,856

TRAILER CONNECTION

Filed Feb. 7, 1923   3 Sheets-Sheet 1

INVENTOR
Alfred F. Masury
BY
Redding, Greeley, O'Shea & Campbell
ATTORNEYS

Nov. 30, 1926.

A. F. MASURY

TRAILER CONNECTION

Filed Feb. 7, 1923

INVENTOR
Alfred F Masury
BY
Redding, Greeley, O'Shea & Campbell
ATTORNEYS

Nov. 30, 1926.
A. F. MASURY
1,608,856
TRAILER CONNECTION
Filed Feb. 7, 1923    3 Sheets-Sheet 3
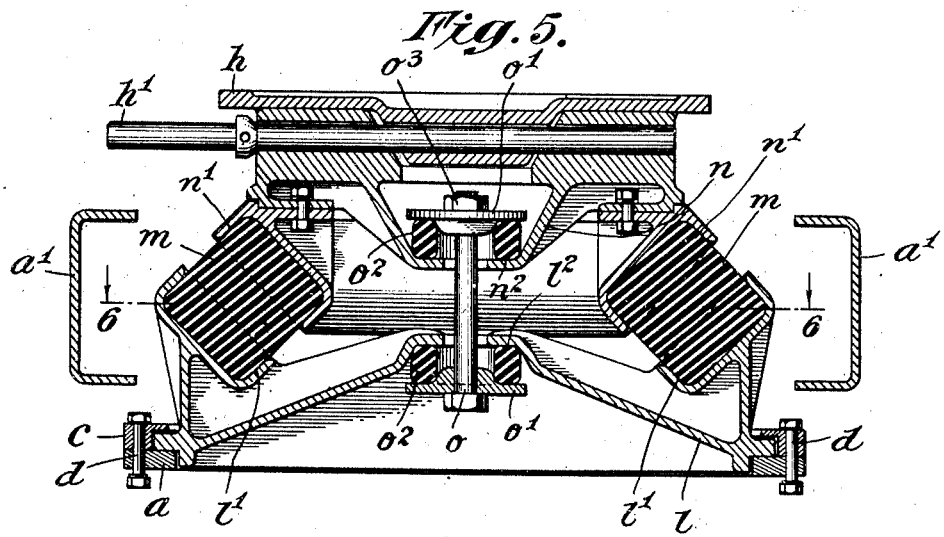
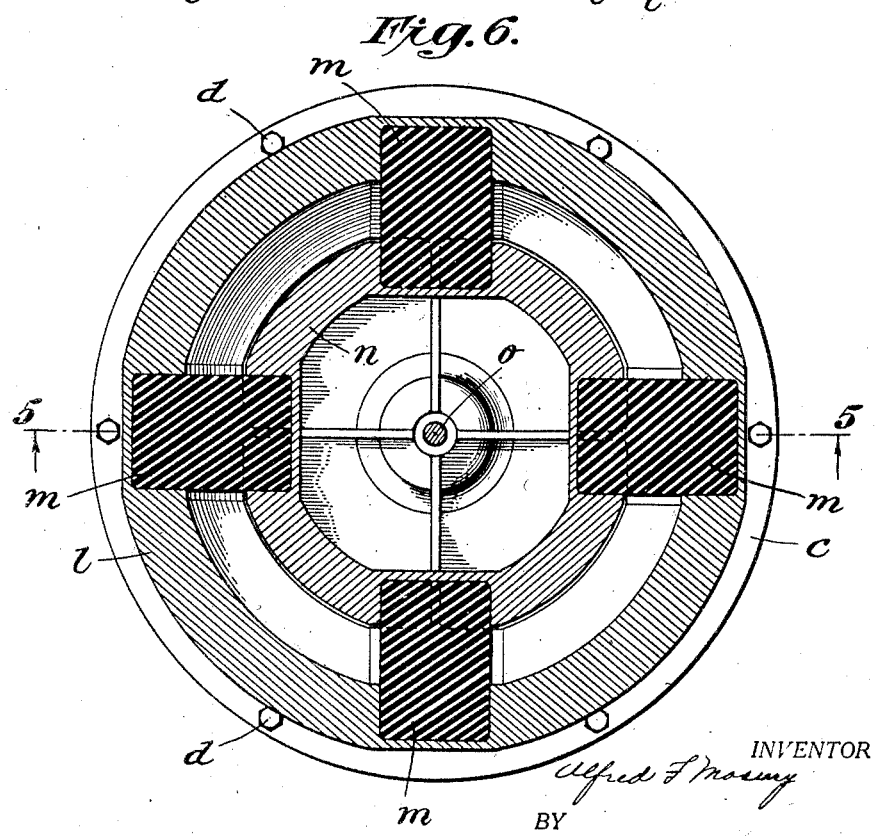
INVENTOR
Alfred F Masury
BY
Redding, Greeley, O'Shea & Campbell
ATTORNEYS Patented Nov. 30, 1926.

1,608,856

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

TRAILER CONNECTION.

Application filed February 7, 1923. Serial No. 617,561.

This invention relates to a trailer connection adapted generally to serve the purpose of the construction shown in U. S. Patent No. 1,380,490 but embodying improvements of a radical nature which may possess certain advantages in manufacture and use. The construction referred to is a trailer connection intended primarily for use for the attachment of semi-trailers to auto tractors. The principal object of the present invention is to provide a connection in which non-metallic units are employed to transmit mechanical stresses from the tractor to the trailer and to afford capacity for universal movement therebetween. The non-metallic units are of a yielding or cushioning nature and not only perform the functions indicated but, in addition, cushion the stresses incidental to starting and stopping of the tractor with its trailer and also the stresses which are ordinarily imposed upon the metal parts of such a connection by road shocks on either of the connected vehicles.

It will be apparent as the description proceeds that the structures embodying the improvements may be varied within wide limits and to emphasize this three different embodiments of the invention have been illustrated in the drawings. The invention is not to be limited to the details of construction but is addressed particularly to the broader aspects of employing non-metallic cushioning elements in a trailer connection which shall be so disposed with respect to the connected units as to perform mechanical work and constitute a positive connection therebetween.

A further object of the invention is to incorporate in a trailer connection having yielding connecting elements means for maintaining such yielding elements under compression for the purpose of enhancing their action and increasing their life.

Reference is now to be had to the accompanying drawings for an understanding of the principle involved. In the drawings:

Figures 5 and 6 are similar views, respectively, to Figures 1 and 2 showing a further modification in which inclined yielding blocks resist twisting movements and carry the load.

On the auto tractor (not illustrated) may be carried a ring $a$ on which rests rotatably a plate $b$ which is retained in desired relation to the ring by a gib $c$ secured thereto by bolts $d$. Rotation of the plate $b$ on the ring $a$ affords necessary angular movement between the auto tractor and the semi-trailer connected therewith in a manner similar to that described in Patent No. 1,380,490.

Side frame members of the tractor are indicated at $a'$. The problem is to connect the tractor with the semi-trailer through means which will afford universal movement of the body of the trailer with relation to the body of the tractor and will oppose yieldingly such universal movement and protect the connecting elements against the stresses and shocks received from the road and received in starting and stopping the tractor. In the construction illustrated in Patent No. 1,380,-490 shafts are disposed at right angles in the connection between the tractor and the trailer so as to provide for universal movement and metal springs are operatively employed to absorb the stresses. The improved construction eliminates the unyielding connection constituted by the said shafts and eliminates the metal springs used to counteract the stresses impressed on the parts and provides for a yielding but positive connection between the tractor and trailer so that free universal movement therebetween is afforded and yet all stresses cushioned.

Figure 1:
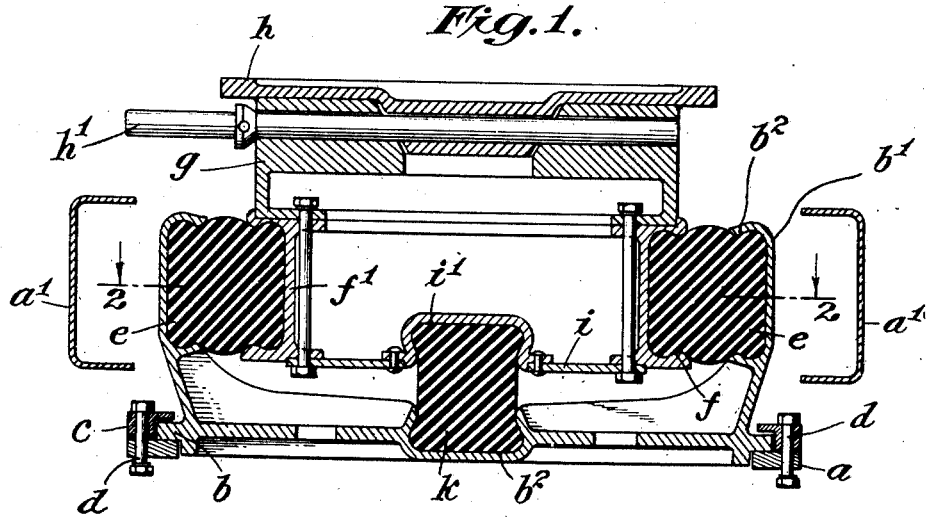
Figure 1 is a view in vertical section through a trailer connection in which yielding blocks are interposed to absorb lateral stresses and an independent yielding block is provided to support the load at the front end of the trailer, the view being taken on the planes indicated by the broken line 1—1 of Figure 2 and looking in the direction of the arrows.
Figure 2:
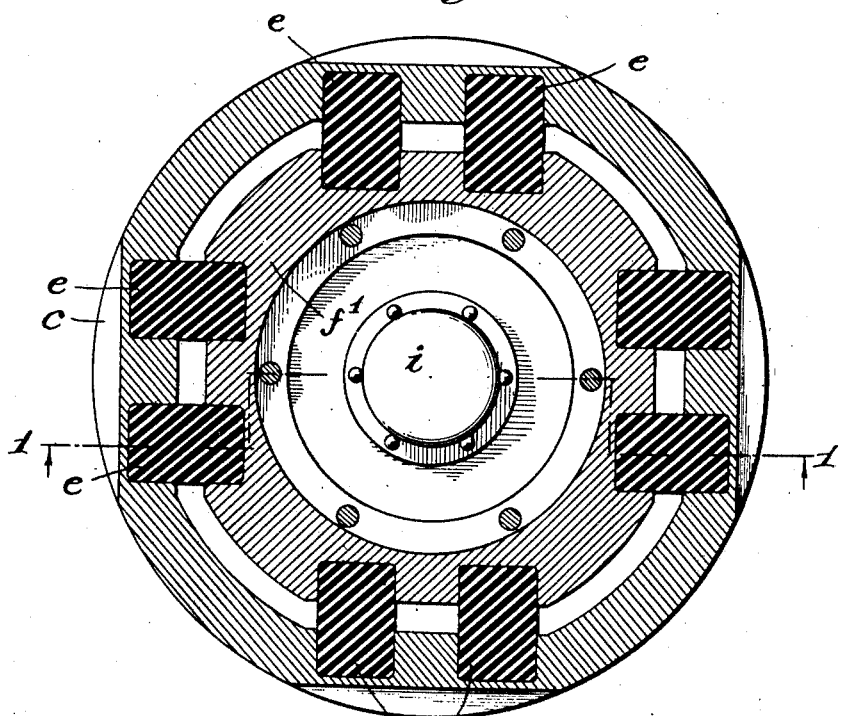
Figure 2 is a view in horizontal section through the connection illustrated in Figure 1 and taken on the plane indicated by the line 2—2 of Figure 1 and looking in the direction of the arrows.

In the embodiment shown in Figures 1 and 2, for instance, the lower rotatable plate $b$ carries therewith a vertically extending ring $b'$ in which are formed at desired points on the inner periphery thereof a series of seats $b^2$ in which are clinched non-metallic cushioning elements $e$ formed as rubber blocks or the like. These blocks which are disposed substantially radially with respect to the lower plate $b$ are seated, respectively, in opposed seats $f$ formed in an annular carrier $f'$ to which is secured an upper plate or coupling plate adapted for connection to a complementary coupling plate $h$ carried by the semi-trailer, a locking pin $h'$ serving to connect the plates $g$, $h$ in a manner with which the invention is not concerned.

With the annular carrier $f'$ may also be carried a plate $i$ which is provided centrally thereof with a seat $i'$ for a vertically disposed block $k$ having the characteristics of the other blocks $e$ but disposed vertically to receive the direct load at the forward end of the semi-trailer. The block $k$ may be seated centrally of the lower plate $b$ a recess $b^2$ being formed therein for this purpose.

As a further distinctive feature of the improved construction the various seats described for the blocks $e$, $k$, will be constricted at their entrance so that the blocks will be confined therein under compression. It has been found in practice that where rubber is employed its elasticity and life are increased by confining it under compression in cases where, as the present, it is to transmit mechanical stresses and do work.

The construction thus far described by way of example, serves to bring out the underlying principle. The block $k$ carries the vertical load which is transmitted through the plate $b$ to the ring $a$ on the tractor. The yielding nature of the block $k$ will permit universal movement between the trailer and the tractor. Such universal movement whether the result of starting and stopping of the tractor or road conditions will be yieldingly resisted by the opposed blocks $e$ mounted at intervals around the carrier ring $f'$ as will be evident from Figure 2. The number of blocks will depend upon conditions to be met, eight being illustrated as arranged in pairs in the four quadrants around the axis of the block $k$. These blocks being confined under compression will be very durable and will serve to limit the universal movements of the upper plate $g$ with respect to the lower plate $b$, as is desirable. All of the disadvantages incidental to the use of positive metal connections in such a situation are overcome such as noise, difficulty of lubrication, and excessive wear. Both the traction and riding qualities of the connection are improved.

Figure 3:
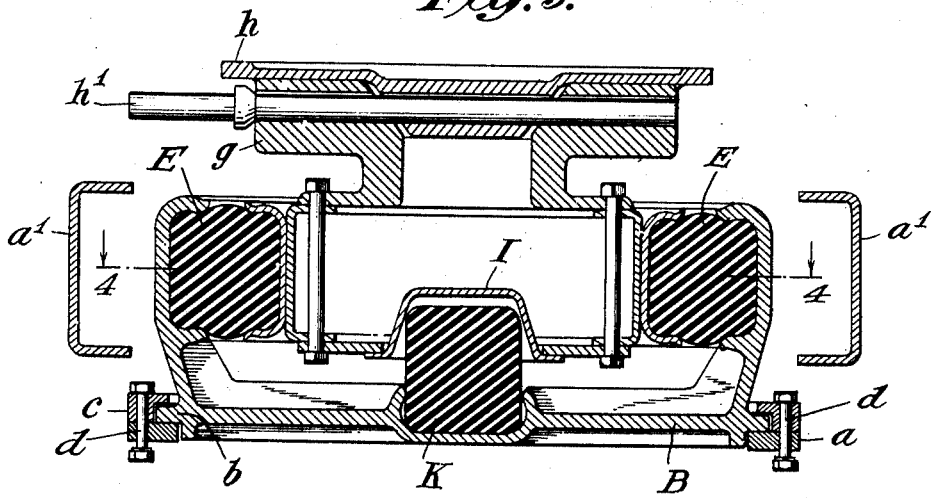
Figures 3 and 4 are views similar, respectively, to Figures 1 and 2 but showing a somewhat modified construction in which both the load of the semi-trailer and the lateral stresses are taken through horizontally yielding blocks while an additional central block in the connection supplements the action thereof when a predetermined range of movement is exceeded.
Figure 4:
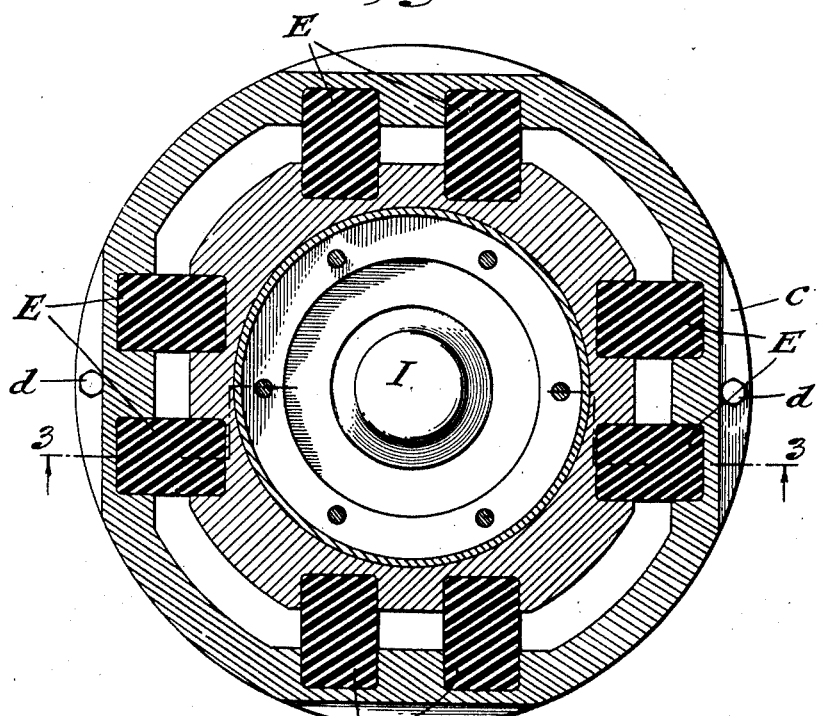

The construction shown in Figures 3 and 4 is substantially like that illustrated in Figures 1 and 2 except that Figure 3 emphasizes the practicability of supporting the load at the front end of the semi-trailer through the horizontally disposed blocks E. Under such conditions it is proposed to support a block K centrally of the lower plate B and in such relation to the plate I that the block K will supplement the action of the blocks E when the front end of the trailer has exceeded a predetermined range of movement. Otherwise, the universal action described will be permitted by the relation of parts and the stresses absorbed and resisted yieldingly in the most effective manner possible.

A further modification which is considered most practicable is illustrated in Figures 5 and 6. In this construction a lower plate $l$ carries seats $l'$ which are disposed in the illustrated construction at an angle of 45° to the horizontal although the invention is not to be limited to the precise angle at which the supporting blocks $m$ are tilted. It is proposed, however, that a plurality of blocks $m$ shall be mounted about the axis of the lower plate $l$ and tilted upwardly and inwardly to support effectively the upper plate $n$ which carries seats $n'$ for the respective blocks opposed to the several seats $l'$ in the lower plate $l$. By tilting blocks $m$ in the manner suggested it may be found that horizontal and vertical components incidental to the support of the load and the resisting of horizontal stresses will be most effectively counteracted and absorbed. Convenient means for holding the plates $n$ and $l$ against separation and for confining the blocks $m$ under compression may consist of a bolt $o$ passing centrally through the plates and carrying washers $o'$ which engage non-metallic yielding rings $o^2$ of rubber or the like and compress these rings when the nut $o^3$ on the bolt is tightened. The plates $l$ and $n$ are formed, respectively, with seats $l^2$, $n^2$, respectively, at the central portions thereof for the rings $o^2$. With the various parts in the relationship described when the nut $o^3$ is tightened the opposed washers $o'$ are drawn towards each other and transmit binding action through the yielding rings $o^2$ to the plates $n$, $l$, and thereby compress to a greater or less degree the blocks $m$ and lock the two plates yieldingly together so as to prevent accidental separation thereof and displacement of the blocks $m$ in their respective seats $l'$, $n'$.

The action of the yielding elements $m$ in the last described embodiment should be evident. The front end of the trailer is supported yieldingly thereby and universal movements of the trailer about the bolt $o$ are resisted yieldingly by the blocks whether or not these movements occur in connection with the starting and stopping of the tractor or come from road shocks. The yielding rings $o^2$ permit universal movement of the two plates $l$, $n$ with respect to one another as will be evident.

As indicated hereinbefore changes in structure of trailer connections in which yielding elements are employed for the purposes described will suggest themselves to one skilled in the art but all such modifications in design are to be deemed within the spirit of the invention so long as the action secured by the employment of non-metallic cushioning units is obtained.

What I claim is:

1. A trailer connection including a plate carried with the tractor, a plate carried with the trailer and means uniting the two with capacity for universal movement therebetween including yielding non-metallic units and means for positively engaging the same under compression with said plates, respectively, which cushion the movements and transmit mechanical stresses.

2. A trailer connection including a plate carried with the tractor, a plate carried with the trailer, said plates being provided with opposed recesses, and yielding non-metallic blocks confined in said recesses, respectively, under compression to oppose, yieldingly, all horizontal and vertical stresses tending to displace said plates with respect to one another.

3. A trailer connection including a plate carried with the tractor, a plate carried with the trailer, non-metallic yielding blocks engaged positively with the respective plates, and yielding means to hold said plates yieldingly against separation in all directions, said means serving to maintain the blocks in predetermined relation to said plates.

This specification signed this 5th day of February, A. D. 1923.

ALFRED F. MASURY.